United States Patent [19]

Ruhnau

[11] Patent Number: 5,676,340
[45] Date of Patent: Oct. 14, 1997

[54] ADAPTOR WITH OFFSET BASE FOR VEHICLE BEVERAGE RECEPTACLES

[76] Inventor: Warren Ruhnau, 8251 Garden View Ct., Jacksonville, Fla. 32256

[21] Appl. No.: 543,829

[22] Filed: Oct. 16, 1995

[51] Int. Cl.⁶ ................................................ A47K 1/08
[52] U.S. Cl. .................. 248/311.2; 248/310; 248/314; 224/926
[58] Field of Search .................. 248/309.1, 310, 248/311.2, 314, 315, 912; 224/926

[56] References Cited

U.S. PATENT DOCUMENTS

| D. 366,600 | 1/1996 | Laskowski et al. | D7/620 |
|---|---|---|---|
| 2,696,370 | 12/1954 | Gafford | 248/311.2 X |
| 4,854,468 | 8/1989 | Dahlquist, II et al. | 248/346.1 X |
| 5,088,673 | 2/1992 | Chandler | 248/311.2 |
| 5,102,085 | 4/1992 | Wieczorek et al. | 248/311.2 |
| 5,102,086 | 4/1992 | Thomason | 248/311.2 |
| 5,135,195 | 8/1992 | Dane | 248/314 X |
| 5,174,534 | 12/1992 | Mitchell | 248/311.2 |
| 5,285,953 | 2/1994 | Smith | 229/1.5 H |
| 5,326,064 | 7/1994 | Sapien | 248/311.2 |
| 5,330,145 | 7/1994 | Evan et al. | 248/311.2 |
| 5,490,653 | 2/1996 | Ingwersen | 248/311.2 |

FOREIGN PATENT DOCUMENTS 1252312  12/1960  France .................. 248/311.2

Primary Examiner—Alvin C. Chin-Shue
Assistant Examiner—Richard M. Smith
Attorney, Agent, or Firm—Thomas C. Saitta

[57] ABSTRACT

An adaptor for holding over-sized beverage containers for use in cylindrical beverage receptacles found in many vehicles, the adaptor having an enlarged upper portion to receive the beverage containers and a lower portion comprising an insertion base sized to fit within the vehicle beverage receptacle. The lower portion is offset from the upper portion such that the device can be used in circumstances where the vehicle receptacle is mounted too closely to a vertical surface or where a pair of vehicle receptacles have a small separation distance.

16 Claims, 1 Drawing Sheet

ADAPTOR WITH OFFSET BASE FOR VEHICLE BEVERAGE RECEPTACLES

BACKGROUND OF THE INVENTION

This invention relates generally to devices suitable for holding beverage containers such as glasses, bottles, cans, cups or mugs, and more particularly to such devices which are adaptor inserts constructed to seat within the cylindrical beverage receptacles typically found in cars, trucks, vans, recreational vehicles, boats, golf carts or the like, to accommodate beverage containers of large diameters, heights and differing configurations. Even more particularly, the invention relates to beverage container holder adaptor inserts which have eccentric or offset insertion members, i.e., where the cylindrical insertion member adapted to fit into the vehicle beverage receptacle is not coaxially aligned with the cylindrical upper portion adapted to receive the beverage container.

Many vehicles now come equipped with built-in cylindrical beverage receptacles, the receptacles usually being tubular with a solid bottom and having a diameter slightly greater than that of a typical 12 ounce beverage can. Many common beverage containers such as large bottles, large nestable cups, sport drink containers and handled mugs will not fit into the standard built-in receptacles. A number of devices have been developed to address this problem. For examples of these devices, see U.S. Pat. No. 5,326,064 to Sapien, U.S. Pat. No. 5,135,195 to Dane. A problem encountered with the known adaptor insert devices is that the insertion portion is concentric or coaxial with the receiver portion, i.e., both the lower insertion portion and the upper receiver portion share a common central longitudinal axis. Many vehicle beverage receptacles are positioned adjacent a vertical surface, such as the dash or side panels of doors, which precludes the use of standard adaptor inserts because there is not enough clearance between the vehicle receptacle and the vertical surface for the expanded diameter of the upper container receiving portion. Additionally, many vehicle beverage receptacles are positioned in pairs of close proximity, which prevents usage of two typical adaptor inserts at the same time since there is not enough space between the two to accommodate the combined expanded diameters of the two upper portions.

It is an object of this invention to provide an adaptor device for holding beverage containers which can be used in situations where the vehicle beverage receptacle is positioned adjacent a vertical surface or where two beverage receptacles are mounted in close proximity, the adaptor having a cylindrical lower insertion portion sized to fit securely within the cylindrical vehicle beverage receptacle and a cylindrical upper receiver portion of greater diameter to receive and hold large beverage containers, where the lower portion is offset from the upper portion so that they do not share a common longitudinal axis. It is a further object to provide such an adaptor insert where the lower portion is rigidly and fixedly attached to said upper portion and offset to the extent that a part of the outer wall of the lower portion is flush with a part of the outer wall of the upper portion. It is a further object to provide such an adaptor insert which comprises two vertical slots to accommodate the handles on mugs or cups, the two slots allowing easy access from either side of the adaptor.

SUMMARY OF THE INVENTION

The invention comprises an adaptor device for holding beverage containers, a beverage container being defined to include a glass, can, bottle, cup or mug, which can accommodate beverage containers of differing sizes and configurations, the adaptor holder device being designed to fit into the standard built-in cylindrical beverage receptacles found in many vehicles. The adaptor provides a means to adequately hold and secure beverage containers which have an outer diameter greater than the inner diameter of the vehicle receptacles. The adaptor beverage container holder comprises an adjoined upper portion and a lower portion, the upper portion being adapted to receive and secure the beverage container to prevent spilling and the lower portion being adapted to secure the holder itself in a stable manner within the standard vehicle receptacle.

The lower portion of the adaptor is comprised of a tubular insertion base sized to fit within the inner diameter of the standard vehicle beverage receptacle, which is typically dimensioned at about 2.5 inches. The upper portion of the adaptor is comprised of a circular bottom and a tubular, vertically extending wall preferably containing one or more vertical slots to allow for retention of beverage containers having side-mounted handles. The inner diameter of the upper portion is greater than the inner diameter of the vehicle receptacle to allow for retention of beverage containers of larger diameter than 2.5 inches. A preferred typical size for the inner diameter of the upper portion is about 3.75 inches. The upper portion extends approximately 3 inches in height and the lower portion extends approximately 2 inches in height, although the exact dimensions may of course vary to some degree. The central longitudinal axis of the lower portion is offset from the central longitudinal axis of the upper portion, preferably to the extent that a part of the outer wall of the lower portion is even with a part of the outer wall of the upper portion. This allows the adaptor insert to be utilized in circumstances where the standard vehicle beverage receptacle is positioned too close to a vertical surface, such as adjacent a door panel or dash, to allow placement of a standard adaptor insert having coaxial upper and lower portions. This also allows two such adaptor insert devices to be used in circumstances where a pair of vehicle beverage receptacles are positioned with a narrow separation distance. The adaptor is preferably provided with a longitudinal slot to receive handles of cups or mugs, and is preferably provided with two such slots positioned on different sides of the adaptor to allow easy use from either side.

DETAILED DESCRIPTION OF THE INVENTION

Figure 1:
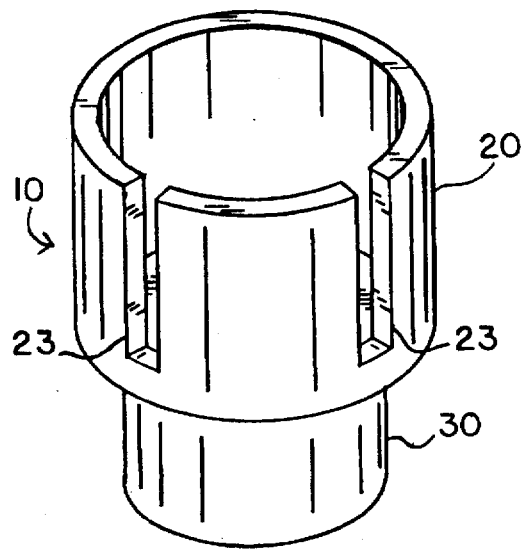
FIG. 1 is a perspective view of the invention.

With reference now to the drawings, the invention will be described in detail with regard to the best mode and preferred embodiment. The invention is in general an adaptor device 10 for use with vehicle beverage receptacles 99 suitable for retaining in a stable and relatively secure manner any of a variety of over-sized beverage containers such as a glass, cup, bottle, can, mug, sport bottle. The adaptor 10 comprises an upper portion 20 to receive the beverage container and a lower portion 30 adapted to be insertable into a standard cylindrical beverage receptacle 99 such as commonly found in cars, trucks, RV's, boats, golf carts, etc., the adaptor 10 allowing for the retention in upper portion 20 of beverage containers whose outer diameter exceeds the inner diameter of the standard built-in vehicle receptacle 99, which is typically sized to hold a 12 ounce can. Both the upper portion 20 and the lower portion 30 are preferably tubular, although the lower portion 20 can be cylindrical, with the outer diameter of the lower portion 30 being smaller than the outer diameter of the upper portion 20. The lower portion 30 and upper portion 20 are fixedly joined such that there is no movement between the two members, the junction forming a preferably solid bottom 21. Upper portion 30 is comprised of a generally vertical wall 22 which contains one or more vertical slots 23, the slot 23 allowing a handled cup or mug to be retained within the upper portion 20 such that the handle extends though slot 23. The lower portion 30 comprises an insertion base adapted to fit into the cylindrical vehicle receptacle 99, preferably circular or annular in cross-section and being either tubular or a solid cylinder depending on manufacturing and other considerations. The overall length of lower portion 30 can be shorter than the depth of the vehicle receptacle 99 such that the bottom 21 will rest on the upper surface of the vehicle receptacle 99 when the adaptor 10 is in place, or can be longer than the depth of the vehicle receptacle 99, in which case the adaptor insert 10 must be properly sized for a snug fit.

Figure 2:
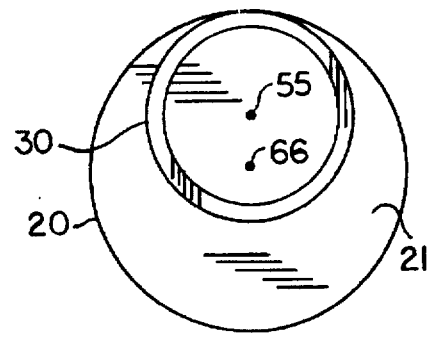
FIG. 2 is a bottom view of the invention.
Figure 3:
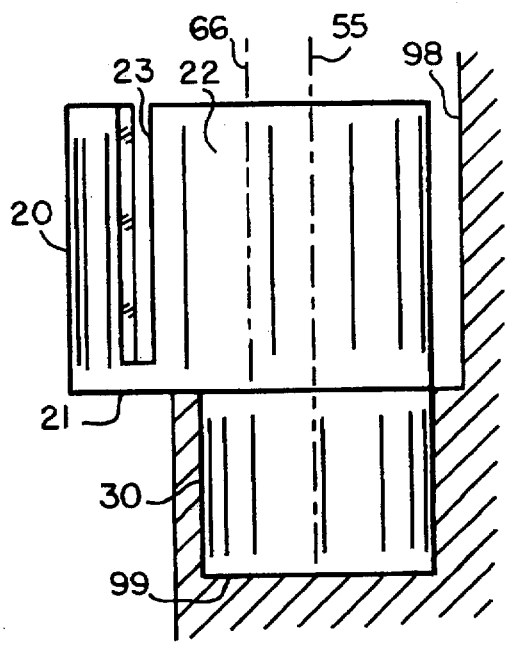
FIG. 3 is a side view of the invention showing the adaptor insert positioned within a vehicle beverage container receptacle adjacent a vertical wall, as shown in cross-section.
Figure 4:
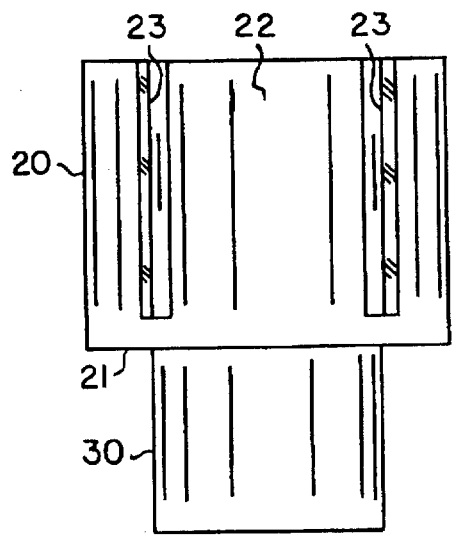
FIG. 4 is a front view of the invention.

As shown in FIGS. 2 and 3, the central longitudinal axis 55 of the lower insertion portion 30 is offset from the central longitudinal axis 66 of the upper receiving portion 20. This allows the device to be utilized in circumstances where the vehicle receptacle 99 is placed adjacent a vertical surface 98, such as a door panel, seat or dash. Because the lower portion 30 and upper portion 20 are eccentrically connected, the bottom 21 of upper portion 20 will extend from the lower portion 30 in an unbalanced manner. Preferably, the upper portion 20 and lower portion 30 are offset to the extent they intersect at a common point, such that a part of the outer wall of lower portion 30 is flush with a part of the outer wall of the upper portion 20. This insures that the adaptor insert 10 can be used in all circumstances, since the adaptor can be positioned within the vehicle receptacle 99 as shown in FIG. 3 with all of the upper portion 20 extending away from the vertical surface 98. For an adaptor with an upper portion 20 with an outer diameter of approximately 3.75 inches and a lower portion 20 with an outer diameter of approximately 2.5 inches, the outer wall of the upper portion 20 will extend approximately 1.25 inches beyond the outer wall of the lower portion 30 at the point opposite from the common intersection point of the outer walls of the upper portion 20 and lower portion 30. A typical adaptor of the same dimensions as above with coaxially positioned members will have an extension of approximately 0.625 inches on each side, precluding use of the device if the vehicle receptacle 99 is mounted less than 0.625 inches from a vertical surface 98. Likewise, in situations where a vehicle has a pair of beverage receptacles 99, the beverage receptacles 99 must be mounted at least 1.25 inches apart to provide enough clearance for the use of two typical coaxial adaptors. In the adaptor insert 10, the offset upper portion 20 allows for the use of two such adaptor inserts 10 in a pair of vehicle beverage receptacles 99 no matter how small the separation distance.

It is preferable that a longitudinal slot 23 be positioned in the wall of the upper portion 20 to allow the adapter insert 10 to be useful for cups and mugs having side mounted handles. The handles will extend through slot 23 when the beverage container is placed into the upper receiving portion 20. Preferably, the adaptor insert 10 is provided with two slots 23, each slot preferably located between 90 and 170 degrees from the common intersection point of the outer walls of upper portion 20 and lower portion 30. Most preferably, each slot 23 is positioned 120 degrees from this point. Providing dual slots 23 allows the convenient and easy use of the adaptor insert 10 no matter which side of the adaptor 10 the user is seated on or which hand the user prefers to use to hold the cup or mug.

It is contemplated that equivalents and substitutions may be obvious to those skilled in the art, and the true scope and definition of the invention therefore is to be as set forth in the following claims.

I claim:

1. An adaptor device for holding beverage containers for use with a hollow cylindrical beverage receptacle in a vehicle, said adaptor device comprising:

an upper portion comprising a vertically extending tubular wall having a central longitudinal axis and a lower portion having a central longitudinal axis which is adapted to fit securely within said vehicle beverage receptacle, where said upper portion diameter is greater than said lower portion diameter and where said upper portion is fixedly and immovably joined to said lower portion in an eccentric manner, such that said upper portion central longitudinal axis is different from said lower portion central longitudinal axis, and where said lower portion comprises an outer wall, and where said upper portion tubular wall and said lower portion outer wall have a single common intersection point.

2. The device of claim 1, where said upper portion further comprises a vertical slot in said tubular wall.

3. The device of claim 1, where said upper portion further comprises two vertical slots in said tubular wall.

4. The device of claim 3, where said vertical slots are positioned on opposite sides of said upper portion.

5. The device of claim 4, where said vertical slots are positioned 120 degrees apart.

6. The device of claim 4, where said vertical slots are positioned at least 90 degrees from said common intersection point.

7. The device of claim 6, where said vertical slots are positioned 120 degrees from said common intersection point.

8. The device of claim 1, where said lower portion is tubular.

9. The device of claim 1, where said lower portion is cylindrical.

10. An adaptor device for holding beverage containers for use with a hollow cylindrical beverage receptacle in a vehicle, said adaptor device comprising:

an upper portion comprising a vertically extending tubular wall having a central longitudinal axis and a lower portion comprising a vertically extending outer wall, circular in cross-section and having a central longitudinal axis, which is adjusted to cooperate with said cylindrical vehicle beverage receptacle in order to secure said adaptor device within said vehicle beverage receptacle, where said upper portion diameter is greater than said lower portion diameter and where said outer wall of said lower portion is fixedly and immovably joined to said upper portion in an eccentric manner to define a junction where said upper portion central longitudinal axis is different from said lower portion central longitudinal axis, where said upper portion tubular wall and said lower portion outer wall have a single common intersection point, and such that the junction of said upper portion and said lower portion define a bottom to said upper portion.

11. The device of claim 10, where said upper portion further comprises a vertical slot in said tubular wall.

12. The device of claim 10, where said upper portion further comprises two vertical slots in said tubular wall.

13. The device of claim 12, where said vertical slots are positioned on opposite sides of said upper portion.

14. The device of claim 12, where said vertical slots are positioned 120 degrees apart.

15. The device of claim 10, where said lower portion is hollow.

16. The device of claim 10, where said lower portion is solid.

* * * * *